United States Patent [19]

Hanson et al.

[11] Patent Number: 4,514,834
[45] Date of Patent: Apr. 30, 1985

[54] EXPENDABLE UNDERWATER ACOUSTIC PROJECTOR

[75] Inventors: Paul A. Hanson, Spring Valley; James M. Walton, San Diego, both of Calif.

[73] Assignee: The United States of America as represented by the Secretary of the Navy, Washington, D.C.

[21] Appl. No.: 504,907

[22] Filed: Jun. 16, 1983

[51] Int. Cl.³ .............................................. H04R 17/00
[52] U.S. Cl. .................................... 367/141; 367/148; 367/153; 367/189; 181/113
[58] Field of Search ............... 181/110, 151, 111, 161, 181/139, 163, 142, 113; 116/26, 27, 145; 73/672; 74/56, 57; 367/140, 141, 142, 148, 153, 187; 335/154

[56] References Cited

U.S. PATENT DOCUMENTS

| 1,445,003 | 2/1923 | Collier | 74/57 |
|---|---|---|---|
| 2,121,411 | 6/1938 | Schroder | 181/0.5 |
| 2,211,741 | 8/1940 | Elwell | 74/56 |
| 2,840,176 | 6/1958 | Davis | 181/0.5 |
| 3,100,022 | 8/1963 | Clark | 181/0.5 |
| 3,137,835 | 6/1964 | Bielecki et al. | 367/142 |
| 3,226,671 | 12/1965 | Padberg | 340/5 |
| 3,265,152 | 8/1966 | Kass | 181/0.5 |
| 3,319,735 | 5/1967 | Hayes et al. | 181/0.5 |
| 3,495,022 | 2/1970 | Koehl | 84/1.25 |
| 3,596,525 | 8/1971 | Niesz | 74/57 |
| 3,605,080 | 9/1971 | Abbott | 340/12 |
| 3,906,884 | 9/1975 | Gould | 114/235 B |
| 3,997,860 | 12/1976 | Kaplan | 335/154 |
| 4,030,063 | 6/1977 | Wallen | 367/172 |
| 4,047,592 | 9/1977 | Sieber et al. | 181/142 |
| 4,332,017 | 5/1982 | Massa | 367/142 |
| 4,353,120 | 10/1982 | Pickens | 367/142 |
| 4,387,451 | 6/1983 | Wilcox | 367/142 |
| 4,400,804 | 8/1983 | Konrad | 367/142 |

Primary Examiner—Harold J. Tudor
Attorney, Agent, or Firm—R. F. Beers; E. F. Johnston; T. G. Keough

[57] ABSTRACT

An expendable sound source provides a cost effective projection of acoustic energies in the ocean. A tubular housing contains a d.c. motor that locates its shaft coaxial with the housing. Cylindrically-shaped camming blocks engage spurs in a pair of rigid pistons at both ends of the tubular housing to reciprocate them in accordance with the pattern of the camming surfaces and the motor speed. A flywheel on the shafts and journaling supports assure the projection of arbitrary waveforms and a key-and-keyway cooperation between the housing and prevents the pistons turning in the housings. A self-contained, high energy battery pack is actuated by magnetic reed switch to assure reliable long term projection after deployment. Pressure compensation can be included.

2 Claims, 4 Drawing Figures

EXPENDABLE UNDERWATER ACOUSTIC PROJECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the field of devices for transmitting acoustic energy through a water medium. More particularly it concerns an apparatus for projecting acoustic energy through a water medium that is compact and fabricated in such a manner as to present a cost effective, expendable sound source. In still greater particularity the improved apparatus for projecting acoustic energy employs a d.c. motor that imparts simultaneous outward and simultaneous inward displacements of a pair of rigid pistons to produce a desired arbitrary acoustic waveform output when a coaxially contained shaft rotates suitably coupled cams.

Expendable sound sources have been around in one form or another for quite some time. Explosive charges are still an effective, albeit a primitive, way of radiating acoustic energy through the water. One procedure calls for detonating the explosive at a preselected depth to generate a shock wave which is monitored some distance from the source. An obvious disadvantage of such an approach is that the single shock wave does not lend itself to an extended use or analysis. The uncertainty in depth of detonation makes a series of dropped charges unreliable and the amplitude and frequency content of the explosion generated signals make absolute measurements difficult. Other obvious drawbacks are the numerous hazards associated with ordnance which tend to limit their applications and pose handling, stowage and deployment problems. Researchers agree that collecting acoustic data from the ocean is difficult using explosives and the advantages of the high energy, low cost generation of sound waves that explosives offer are often outweighed by other considerations.

The more sophisticated measurements required for meaningful data by researchers as well as for national defense applications by the military call for sound sources that are able to provide acoustic pressure waves which have prolonged duration and more precise frequency structure. The family of transducers employing ferroelectric driving elements or magnetostrictive could be ideally suitable; however, their relatively high per unit cost for low frequency applications makes them a poor choice for an expendable use. Furthermore, the power requirements tend to be excessive at low frequencies due to inefficient conversion of electric to mechanical energy and thereby prevent a self-contained power supply.

A low frequency sound source that could find use as an expendable source was disclosed by George O. Pickens in his U.S. Pat. No. 4,353,120. His transducer was intended to be used as an apparatus for calibrating or otherwise determining the low frequency operational parameters of an elongate hose-like array. A motor drives a bell crank arrangement or linear motors to reciprocate flexible caps that were spaced away from a test array. The reciprocal displacement of the flexible caps causes the radiation of acoustic energy and the bell and crank arrangement, or linear motors, displaced the caps through the vehicle of a fluid filling elongate, outwardly reaching tubes.

The sound source of Pickens, although not specifically stated as being an expendable source, contains relatively unsophisticated components that may make it cost effective. Since acoustic coupling to the water was indicated as being satisfactory for calibration purposes, it could serve as a sonic source; however, a number of modifications may be desirable.

Thus, there is a continuing need in the state-of-the-art for a cost effective expendable sound source that uses reliable, tested components to project an arbitrary waveform from a compact package.

SUMMARY OF THE INVENTION

The present invention is directed to providing an expendable apparatus for projecting acoustic energy through a water medium. An elongate tube is disposed in the water medium for providing a protective enclosure that has a pair of openings at its opposite ends. A motor having a power pack is carried within the elongate tube and is provided with a bidirectionally extending shaft. A rigid projection piston is disposed in each of the openings and a camming means is operatively associated with each end of the bidirectional shaft and a rigid projection piston so that the rigid projection pistons are cammed in coincident diverging and coincident converging reciprocal excursions which are preestablished as an arbitrary waveform pattern on the camming surfaces. A flywheel, journaling supports, appropriate sealing and pressure compensation assures the projection of the arbitrary waveforms of acoustic energy for prolonged periods of time and with great reliability. Modification of the camming surfaces can provide variety in the projected acoustic energy.

A prime object of the invention is to provide an improved, expendable projector of acoustic energy.

Yet another object of the invention is to provide an expendable projector employing a motor having a bidirectionally extending shaft for simultaneous reciprocal excursions of a pair of projection pistons.

Yet another object of the invention is to provide an expendable projector employing rotary camming surfaces for projecting an arbitrary waveform of acoustic energy.

Still another object of the invention is to provide an expendable projector having flywheels, journaling supports, and sealing arrangements to assure reliable long term operation.

Yet another object is to provide an expendable source including the provision for pressure compensation for improved operational characteristics.

Still another object of the invention is to provide an expendable sound source having an electric motor driven by a self-contained power source.

Yet a further object is to provide an expendable sound source having two projection surfaces driven to coincidentally converge and coincidentally diverge with respect to each other to project an arbitrary waveform of acoustic energy.

Still another object of the invention is to provide an expendable sound source capable of being manufactured in quantity at a low cost per unit.

Still another object of the invention is to provide an expendable sound source configured to be launched or deployed from aircraft or ship.

Yet another object is to provide a sound source that is completely self-contained and automatic in operation.

Still another object is to provide an uncomplicated, expendable sound source having simplicity of design and employing few moving parts.

Still another object is to provide an expendable sound source having a modifiable camming surface to provide a variety of different arbitrary waveform signals.

These and all the other objects of the invention will become more readily apparent from the ensuing specification and the appended claims when taken in light of the drawings.

DESCRIPTION OF THE PREFERRED EMBODIMENT

Figure 1:
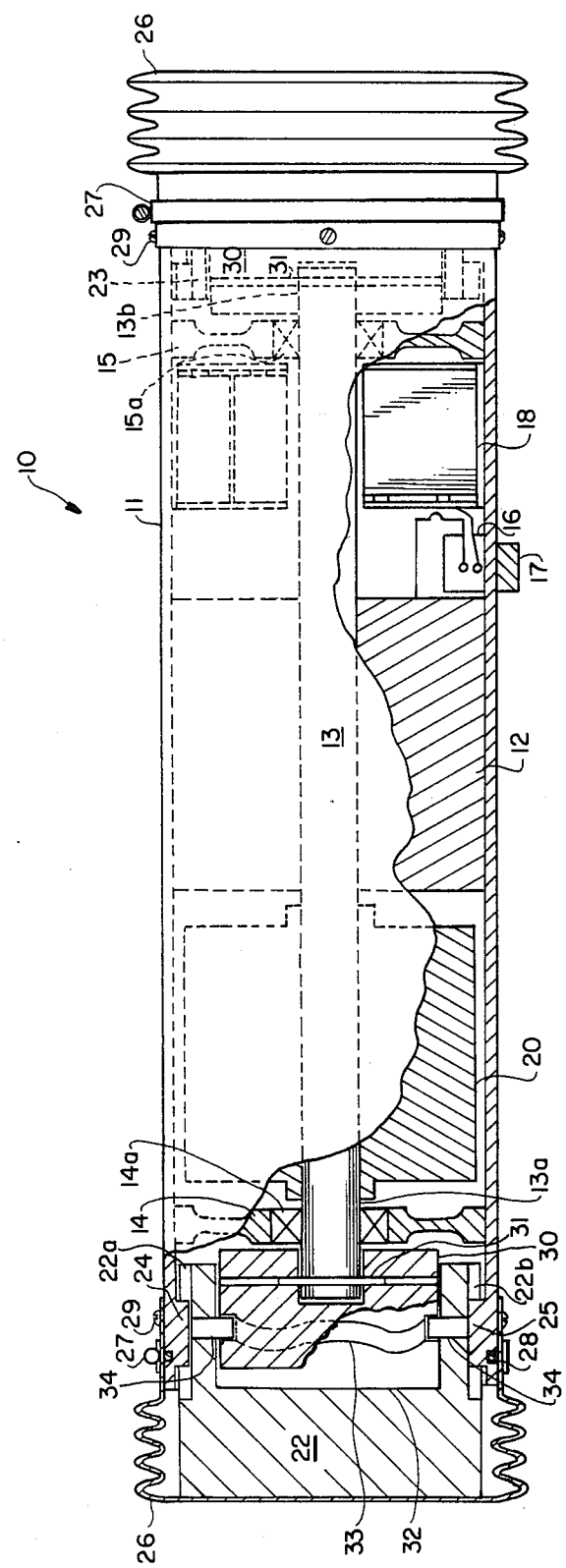
FIG. 1 is a representation of one embodiment of the expendable acoustic energy projector shown partially in cross section.

Referring now to FIG. 1 of the drawings, an expendable sound source 10 has an overall cylindrical configuration with a substantially protuberance free surface to reduce many of the problems associated with deployment and storage. An elongate tube 11 serves as a protective housing for other components to be described and is metal, plastic or a similar rigid, workable material that is both rugged enough to withstand handling abuses and moderate ocean pressures.

A driving motor 12 is mounted approximately midway between the ends of the elongate tube so that its shaft 13 is coaxial with the axis of the tube. A typical drive motor, a d.c. motor, is a model QT-2002 manufactured by Inland of Radford, Va., although different motors could be used depending on the power radiation requirements. This motor has its stator adhered to an inner wall of the elongate tube to hold the motor in place and counteract any reactive torque created as the shaft rotates.

A pair of ring-shaped annular supports 14 and 15 are secured to the inner wall of the tube and are provided with annular bearings 14a and 15a. The supports and bearings journal opposite ends 13a and 13b of the shaft and function to further stabilize the acoustic projector when the motor is actuated.

Actuation of the motor can be by a variety of means such as acoustic command, pressure, etc.; however, for the purposes of enabling and understanding this inventive concept, a magnetic reed switch 16 is depicted with a magnet 17 located outside the elongate tube and adjacent the switch to hold it in the normally OFF condition. When the magnet is removed (removal of the magnet occurs during deployment of the acoustic projector), contacts within the magnetic reed switch are closed to complete a circuit between the driving motor and a power source 18.

The power source is a bank of suitably connected batteries to deliver the proper driving potential and current to the motor. Since it is usually desirable to drive the expendable acoustic projector for a considerable period of time, the bank of batteries can be made up of several commercially available high energy batteries. Lithium batteries have demonstrated increased power capabilities which would make them suitable for this application although it is recognized that all handling and safety problems may still be unresolved.

On the opposite side of the driving motor from the storage batteries a flywheel 20 is secured onto shaft 13. Inclusion of the inertial mass of the flywheel has been found to be advantageous in some instances for the projection of acoustic energy. This optional feature does not overly consume power or the space within the elongate tube and contributes to a more stable operation.

The two openings at the opposite ends of elongate tube 11 are sized to accommodate a pair of driving pistons 22 and 23. The pistons are shaped from metal or stiff composition material and have a mass which provides the proper mechanical impedance for the acoustic projector. A pair of keyways 22a and 22b are provided in opposite sides of the driving piston 22, it being understood that similar keyways are included in driving piston 23. Keys 24 and 25 are molded or machined at opposite sides of elongate tube 11 to cooperate with the keyways 22a and 22b. Similar keys are provided for piston 23. The keys and keyways restrict rotary motion of the driving pistons and permit only axially inwardly and outwardly motion within the elongate tube.

A flexible bellows 26 is fastened onto the outer surface of the driving pistons and a clamp 27 holds the bellows in place on the outside of elongate tube 11. An O-ring 28 is included on the inside of the bellows to help maintain a water tight sealed fitting of the bellows on the tube. Fasteners 29 hold each bellow's axial position with respect to the elongate tube 11.

Reciprocal displacements of the driving pistons to assure the projection of acoustic energy is assured by the mechanical coaction of a rotary camming assembly 30 each of which is mounted by a pin 31 on opposite ends 13a and 13b of the coaxially extending shaft. The camming assembly has an essentially can-shaped cylindrical block 32 provided with a circumferentially disposed camming groove 33. The groove is machined or molded into cylindrical block 32 a sufficient depth to receive and guide a pair of follower spurs or pins 34. Rotation of the cylindrical block rotates the camming groove which in turn translates a responsive reciprocal displacement of the follower pins. Since the follower pins are secured to the driving pistons, responsive reciprocal displacements of the driving pistons are created to radiate acoustic energy.

Two follower pins are shown in the embodiment of FIG. 1. One follower pin could work to a degree and the shape of the groove about the cylindrical camming block could be a single continuous arbitrary design. Experience has demonstrated that the reciprocal displacements of the driving piston are better imparted by a pair of follower pins. This being the case, however, the arbitrary shape of the groove must be repeated every 180° so that the two follower pins are at the same reciprocal axial displacement at the same time. In other words, the followers must be cammed to the same position at the same time by the groove on the cylindrical block and hence the groove must be repeated every 180° to assure the identical reciprocal displacement of both the pins. If more pins are provided, then obviously the arbitrary waveform must be repeated a like number of times around the circumference of the cylindrical block.

Figure 2:
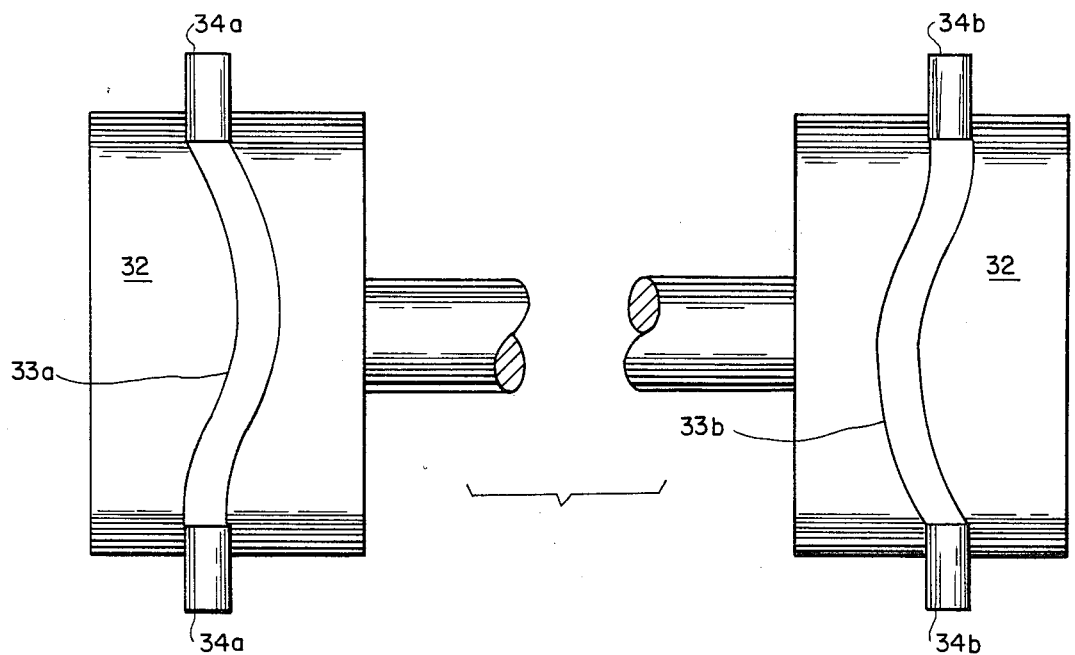
FIG. 2 is a representation of two camming blocks having mirror image grooves to assure coincident outward and coincident inward displacement of the pistons.

The cylindrical camming block to the left in FIG. 1 and the cylindrical block to the right must have their groove shaped as the mirror image of one another, see also FIG. 2. This configuration of the grooves 33a and 33b assures that the driving pistons 22 and 23 are simultaneously displaced outwardly and simultaneously withdrawn inwardly by their follower pins 34a and 34b. The arbitrary pattern of grooves of 33a and 33b is repeated on the backside of the camming blocks to accommodate both pins on each block.

The simultaneous or coincident outward and inward motions provide equal and opposite reactive forces inside the acoustic projector that are self-cancelling as well as maximizing the radiated acoustic power. The acoustic power radiated by the acoustic projector for low frequency is given by the equation:

$$P = 2\pi^3 (\rho/c) f^4 (A \cdot s)^2$$

where P=average radiated acoustic power in ergs per second; $\rho$=water density in $gcm^3$; c=velocity of sound in cm/s; f=frequency in Hz; A=piston area in $cm^2$; and s=amplitude of piston motion in cm.

Frequency output is given by the Fourier series which describes the arbitrary waveform curve or groove that is molded or machined into the camming blocks where the fundamental Fourier frequency is given by $\omega$, the angular frequency of the drive motor 12. The limiting factor is the slope of the arbitrary waveform groove on the camming blocks since it must not exceed limits dictated by the limits imposed by the bearing load strength of the material of the grooved blocks and follower pins. In addition, the radius of the pin must be less than radius of cam curvature.

Figure 4:
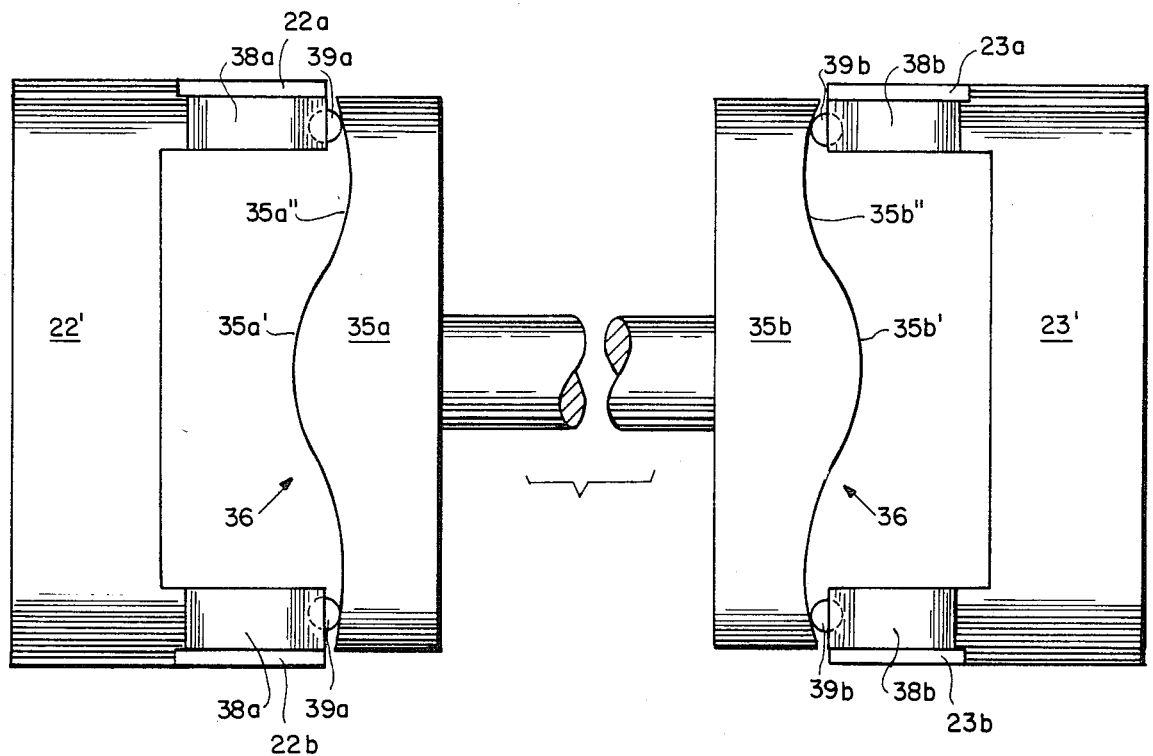
FIG. 4 depicts in greater detail the camming blocks and followers of the embodiment of FIG. 3.
Figure 3:
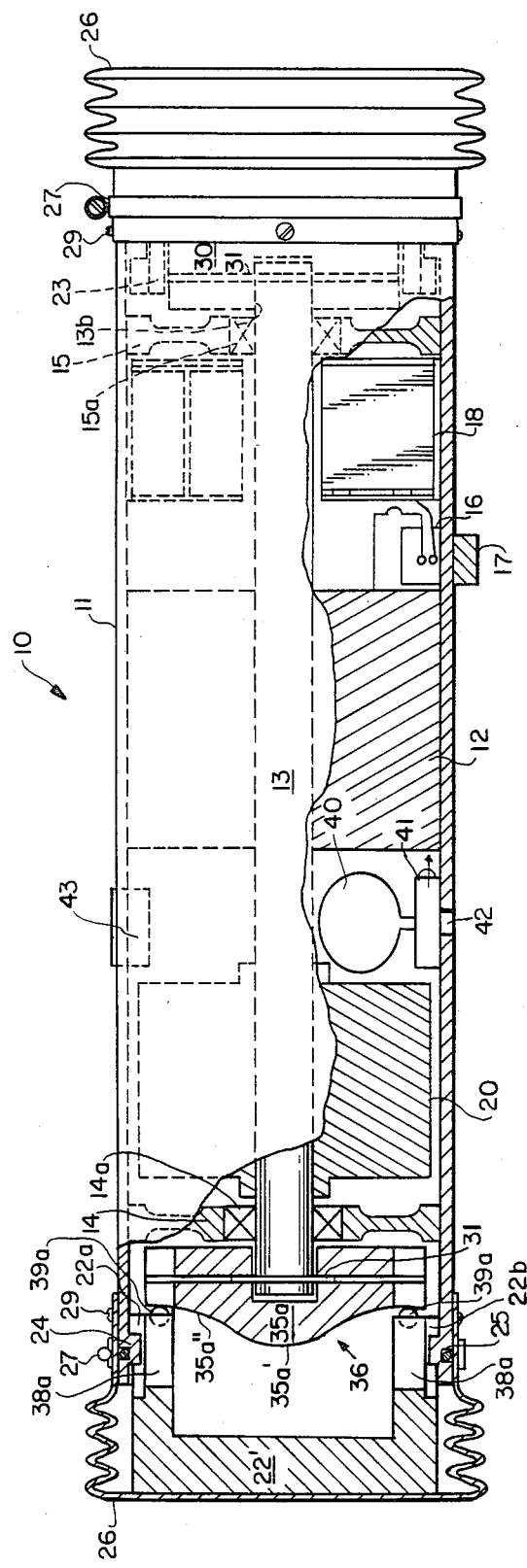
FIG. 3 shows a variation of the embodiment of FIG. 1 in which pressure compensation as well as modified camming surfaces are employed.

The embodiment of FIGS. 3 and 4 shows an acoustic projector having a variation in the rotary camming assembly. A camming block 35a (block 35b is not shown in FIG. 3) has a camming surface of 36 in the form of a series of hills and valleys which causes a responsive displacement of a modified driving piston 22'. A pair of follower portions 38a and b are disposed at a diametrically opposed spacing to ride in the hills and valleys, it again being understood that the series of hills and valleys are repeated every 180° so that the two follower portions of each piston simultaneously occupy an identical reciprocal displacement on the camming surfaces, see FIG. 4. Roller follower bearings 39a and b, or suitable low friction materials such as the material marketed under the trademark Fiberglide, could be provided to reduce wear and friction. The two camming blocks 35a and 35b have hills and valleys 35a' and 35a" and 35b' and 35b" that are the mirror images of one another to assure the coincident displacement of follower portions 38a and 38b and their associated pistons 22' and 23'.

In the embodiment of FIG. 3, ambient water pressure is relied upon to return the driving pistons toward the center of the projector after they have been simultaneously displaced outwardly. The slight vacuum, relative to the outside pressure, returns the driving pistons in this embodiment whereas in the previous embodiment the follower pins riding in the grooves alone translated the bidirectional excursions of the driving pistons. Springs, not shown, could be used to aid the recovery of the pistons after they had been outwardly displaced by the camming blocks.

Another feature depicted in FIG. 3 is the inclusion of a pressurized gas source 40 and an interconnected demand regulator 41. The regulator is responsive to ambient pressures through a diaphragm 42 to release pressurized gas from the source and compensate for increasing pressures as the expendable acoustic projector sinks in the water. The regulator and diaphragm could be identical in design and function to a scuba regulator so further discussion is unnecessary to understand this feature. As an alternative, any suitable chemical gas generation process can be substituted to provide compensation.

A relief valve 42 allows excess pressure to be vented from the expendable acoustic projector. The excess pressure could be created as the projector ascends from the ocean depth, which might be programmed by a time-released buoy.

The pressurized gas source and diaphragm arrangement, as well as the pressure relief valve, could be included in the embodiment of FIG. 1. These features have been deleted from this embodiment to avoid littering the drawings.

Obviously many modifications and variations of the present invention are possible in the light of the above teachings. It is therefore to be understood that within the scope of the appended claims the invention may be practiced otherwise than as specifically described.

We claim:
1. An apparatus for projecting acoustic energy through a water medium comprising:
an elongate tube disposed in the water medium for providing a protective enclosure having a pair of openings;
an electric motor secured to the inside of the elongate tube and having a shaft bidirectionally extending therefrom coaxially with the elongate tube for imparting rotary motion;
means mounted on the shaft for providing an inertial mass to improve the projection of acoustic energy;
means circumferentially connected with the inside of the elongate tube on opposite sides of the electric motor for journaling the bidirectionally extending shaft therein;
means contained within the elongate tube for supplying electrical power to drive the electric motor;
means carried on the elongate tube for magnetically coupling the electrical power supplying means to the electrical motor;
means disposed in both of the pair of openings for defining a pair of rigid projection elements;
means interposed between each rigid projection element defining means and the elongate tube for sealing the inside of the elongate tube from the water medium; and
a pair of cylindrically-shaped elements, each shaped with a camming surface and each cylindrically-shaped element being mounted on an opposite end of the bidirectionally extending shaft, and engaging a follower connected to each rigid projection element defining means for camming the rigid projection elements in coincident diverging and coincident converging reciprocal excursions, the elongate tube is provided with at least one projection near each opening that is shaped to engage correspondingly-shaped axially oriented disposed slots in each rigid projection element defining means to prevent them from being rotated, each camming surface of each cylindrically-shaped element of the camming means is an endless groove having a pattern repeated every 180 degrees on the circumference of eacy cylindrically-shaped element and the follower is two spur-shaped follower projections provided and positioned to engage the groove at diametrically opposed locations on each cylindrically-shaped element;

means carried within the elongate tube and communicating with the water medium for pressure compensating the interior of the acoustic projector; and means provided in the elongate tube for venting excess pressure from the interior of the acoustic projector.

2. An apparatus for projecting acoustic energy through a water medium comprising:

an elongate tube disposed in the water medium for providing a protective enclosure having a pair of openings;

an electric motor secured to the inside of the elongate tube and having a shaft bidirectionally extending therefrom coaxxially with the elongate tube for imparting rotary motion;

means mounted on the shaft for providing an inertial mass to improve the projection of acoustic energy;

means circumferentially connected with the inside of the elongate tube on opposite sides of the electric motor for journaling the bidirectionally extending shaft therein;

means contained within the elongate tube for supplying electrical power to drive the electric motor;

means carried on the elongate tube for magnetically coupling the electrical power supplying means to the electrical motor;

means disposed in both of the pair of openings for defining a pair of rigid projection elements;

means interposed between each rigid projection element defining means and the elongate tube for sealing the inside of the elongate tube from the water medium; and a pair of cylindrically-shaped elements, each shaped with a camming surface and each cylindrically-shaped element being mounted on an opposite end of the bidirectionally extending shaft, and engaging a follower connected to each rigid projection element defining means for camming the rigid projection elements in coincident diverging and coincident converging reciprocal excursions, the elongate tube is provided with at least one projection near each opening that is shaped to engage correspondingly-shaped axially oriented disposed slots in each rigid projection element defining means to prevent them from being rotated, each camming surface of each cylindrically-shaped element of the camming means is a series of hills and valleys on an axially exposed end having a pattern repeated every 180 two follower portions held abutting on the hills and valleys by ambient water pressure at diametrically opposed locations on the axially exposed ends of each cylindrically-shaped element;

means carried within the elongate tube and communicating with the water medium for pressure compensating the interior of the acoustic projector; and means provided in the elongate tube for venting excess pressure from the interior of the acoustic projector.

* * * * *